(12) United States Patent
Khera et al.

(10) Patent No.: US 8,743,875 B2
(45) Date of Patent: Jun. 3, 2014

(54) EXTENSION OF THE INTERPRETATION AND DEFINITION OF THE IS-IS TLV/SUB-TLV

(75) Inventors: Gautam Khera, Walpole, MA (US); Srikanth Keesara, Tewksbury, MA (US); Rama Apalla, Nashua, NH (US)

(73) Assignee: Avaya Inc., Basking Ridge, NJ (US)

( * ) Notice: Subject to any disclaimer, the term of this patent is extended or adjusted under 35 U.S.C. 154(b) by 225 days.

(21) Appl. No.: 13/242,250

(22) Filed: Sep. 23, 2011

(65) Prior Publication Data

US 2013/0077625 A1    Mar. 28, 2013

(51) Int. Cl.
*H04L 12/28* (2006.01)
(52) U.S. Cl.
USPC .......................................................... 370/390
(58) Field of Classification Search
CPC . H04L 12/28; H04L 12/4604; H04L 12/4616; H04L 12/462
See application file for complete search history.

(56) References Cited

U.S. PATENT DOCUMENTS

| 8,059,647 B2 * | 11/2011 | Ashwood-Smith et al. ... | 370/390 |
|---|---|---|---|
| 8,125,928 B2 * | 2/2012 | Mehta et al. ................. | 370/254 |
| 8,199,753 B2 * | 6/2012 | Mehta et al. ................. | 370/390 |
| 2012/0218994 A1 * | 8/2012 | Zheng ........................... | 370/389 |
| 2013/0058349 A1 * | 3/2013 | Khalil et al. .................. | 370/400 |
| 2013/0077624 A1 * | 3/2013 | Keesara et al. ............... | 370/390 |
| 2013/0077625 A1 * | 3/2013 | Khera et al. .................. | 370/390 |
| 2013/0077626 A1 * | 3/2013 | Keesara et al. ............... | 370/390 |
| 2013/0080602 A1 * | 3/2013 | Keesara et al. ............... | 709/220 |
| 2013/0114595 A1 * | 5/2013 | Mack-Crane et al. ........ | 370/390 |
| 2013/0148660 A1 * | 6/2013 | Ashwood-Smith et al. ... | 370/390 |

OTHER PUBLICATIONS

Network Working Group, D. Fedyk, P. Ashwood-Smith, dated Mar. 8, 2011, "IS-IS Extensions Supporting IEEE 802.1aq Shortest Path Bridging, draft-ietf-isis-ieee-aq-05.txt" specifies 802.1aq Shortest Path Bridging (SPB).*
Don Fedyk, Mick Seaman, Janos Farkas, "802.1aq Shortest Path Bridging May Recap", presentation at interim Task Group meeting in Pittsburgh, PA on May 18, 2009.*
Don Fedyk, Mick Seaman, Stephen Haddock, Tony Jeffree, "Draft Standard for Local and Metropolitan Area Networks—Virtual Bridged Local Area Networks,Shortest Path Bridging", prepared by the Interworking Task Group of IEEE 802.1, published Jun. 14, 2011, as P802.1aq/D4.0 Draft Amendment to IEEE Std 802.1Q-2011, pp. a through 294.*
Ayan Banerjee, titled "Extensions to IS-IS for Layer-2 Systems, draft-ietf-isis-layer2-00" was presented by Network Working Group as an Internet-Draft, having a publication date of Mar. 2, 2009, pp. 1 through 20.*

(Continued)

*Primary Examiner* — Andrew Lai
*Assistant Examiner* — Hoyet H Andrews
(74) *Attorney, Agent, or Firm* — Anderson Gorecki & Rouille LLP

(57) ABSTRACT

Techniques disclosed herein include systems and methods for improving efficiency of multicast state generation within Shortest Path Bridging (SPB) networks. Techniques include using an IS-IS TLV structure with new multicast state computation rules for SPB Networks. SPB Networks use a TLV field for the I-SID Address (and equivalent TLV fields defined in different IETF/IEEE drafts) and node nicknames to signal information that is used to compute a multicast state required to provide L2 Services over a given SPB Network. The I-SID Address TLV is set or filled to carry various items of information. These items of information can include Backbone Media Access Control (B-MAC), Virtual Local Area Network Identifier (VID), I-SID[Transmit, Receive Bit], etc.

20 Claims, 6 Drawing Sheets

(56) References Cited

OTHER PUBLICATIONS

David Allan, Peter Ashwood-Smith, Nigel Bragg, János Farkas, Don Fedyk, Michel Ouellete, Mick Seaman, Paul Unbehagen,"Shortest Path Bridging: Efficient Control of Larger Ethernet Networks",was presented in IEEE Communications Magazine, having a publication date of Oct. 2010, vol. 48, Issue 10, pp. 128 through 135.*

Fedyk et al., titled "Draft Standard for Local and Metropolitan Area Networks—Virtual Bridged Local Area Networks—Amendment <>:Shortest Path Bridging" (Fedyk hereinafter) was prepared by the Interworking Task Group of IEEE 802.1, having a publication date of Jun. 14, 2011, as P802.1aq/D4.0 Draft Amendment to IEEE Std 802.1Q-2011.*

Allan et al., titled "Shortest Path Bridging: Efficient Control of Larger Ethernet Networks" (Allan hereinafter) was presented in IEEE Communications Magazine, having a publication date of Oct. 2010, vol. 48, Issue 10, pp. 128 through 135.*

Don Fedyk, Mick Seaman, János Farkas, "802.1aq Shortest Path Bridging May Recap", presentation at interim Task Group meeting in Pittsburgh, PA on May 18, 2009.*

Network Working Group, D. Fedyk, P. Ashwood-Smith, dated Mar. 8, 2011, "IS-IS Extensions Supporting IEEE 802.1aq Shortest Path Bridging, draft-ietf-isis-ieee-aq-05.txt".*

Ayan Banerjee, titled "Extensions to IS-IS for Layer-2 Systems, draft-ietf-isis-layer2-00", was presented by Network Working Group as an Internet-Draft, having a publication date of Mar. 2, 2009, pp. 1 through 20.*

* cited by examiner

EXTENSION OF THE INTERPRETATION AND DEFINITION OF THE IS-IS TLV/SUB-TLV

BACKGROUND

The present disclosure relates to network computing. Computer networks typically include a collection of computing devices enabled to communicate with each other for handling data traffic and control instructions. For example, such devices can include servers, data centers, routers, network switches, management applications, wireless access points, and client computers. Computer networks can provide network connectivity to wired computing devices and/or wireless computing devices.

One type of network technology is known as Shortest Path Bridging (SPB). A set of standards for implementing Shortest Path Bridging is generally specified by the Institute of Electrical and Electronics Engineers (IEEE). Specifically, this standard is identified as IEEE 802.1aq. Network services, including SPB services are commonly provided using Ethernet technology. Ethernet has become a default Data Link Layer technology for data transport, that is, the default for Layer 2 (L2) of the Open Systems Interconnection (OSI) model. SPB can expand Ethernet technologies to other or larger networks. For example, a network that uses IEEE 802.1aq SPB can advertise both topology and logical network membership. SPB uses a link state protocol for such advertising.

In an SPB network, packets are encapsulated at an edge node either in Mac-in-Mac 802.1ah or Q-in-Q 802.1ad frames and transported only to other members of the logical network. IEEE 802.1aq supports unicast and multicast, and all routing is on symmetric shortest paths. IEEE 802.1aq includes Shortest Path Bridging MAC (SPBM) functionality. There exist other related technologies that follow the model of a provider network (transport network) that connects two or more customer networks (access networks), where the provider network is functionally distinct from the customer network, even if a single administrator runs both networks.

A network protocol related to SPB is known as Intermediate System To Intermediate System (IS-IS). IS-IS is a routing protocol that routes data by determining a best route for datagrams transmitted through a packet-switched network. The IS-IS protocol is published by Internet Engineering Task Force (IETF) as an Internet Standard in RFC 1142, as well as in International Organization for Standardization (ISO)/International Electrotechnical Commission (IEC) 10589:2002. SPB Networks can use IS-IS as a control protocol and type-length-value (TLV) structures for control messaging. A TLV structure allows optional information to be encoded within a given packet.

SUMMARY

Certain Shortest Path Bridging (SPB) Networks use IS-IS as the control protocol with TLV structures that include a Backbone Service Instance Identifier (I-SID), also known as a Service Instance Virtual Local Area Network Identifier (VLAN-ID) and found in IEEE 802.1ah. An I-SID can identify a given stream or service attachment information, or otherwise distinguish services within a Provider Backbone Bridges (PBB) domain. Under current TLV definitions, each SPB device within a transport network can signal transmit and/or receive interest for any given I-SID. Conventional TLV definitions and the rules for computing a multicast state are defined in a manner such that for a given I-SID, nodes within an SPB network generate a multicast state that links all SPB devices that signal or indicate (in the I-SID) a receive interest, with all SPB devices that signal that they are transmitting data for that I-SID. This kind of multicast state generation is more appropriate for Layer-2 broadcast applications in which the receiving devices need to receive multicast data from sending devices on the I-SID.

In the Layer 3 (L3 network layer of the OSI model) multicast applications, such a conventional technique leads to inefficient multicast state generation. This inefficiency results because for L3 multicast operations, a given receiver (receiving device or node) is interested in getting multicast data from only one device that sends data for the I-SID.

Techniques disclosed herein include systems and methods for improving efficiency of multicast state generation. Techniques include using an IS-IS TLV structure with new multicast state computation rules for SPB Networks. SPB Networks use a TLV field for the I-SID Address (and equivalent TLV fields defined in different IETF/IEEE drafts) to signal information that is used to compute a multicast state used to provide L2 Services over a given SPB Network. The I-SID Address TLV is set or filled to carry various items of information. These items of information can include Backbone Media Access Control (B-MAC), Virtual Local Area Network Identifier (VID), I-SID[Transmit, Receive Bit], etc.

A related multicast Shortest Path First (SPF) algorithm operates by matching I-SIDs that have a transmit set to same I-SIDs with a receive bit set. This technique can function in part because the I-SID space defined for L2 services is global, and because the B-MAC is ignored (used for unicast SPF). In the case of multicast, the I-SID allocation can be executed on a per-node basis. Thus, the I-SID allocation is local to each node advertising it. Accordingly, multicast receivers identify a specific node from which the multicast service is requested. This multicast information can be embedded in the B-MAC by using the multicast Destination Address (DA) format by having the nickname of the source node and the I-SID set to all zeroes. This technique changes the semantics of the I-SID Address TLV to carry Node information (nickname of the node embedded in the B-MAC field) of the source Backbone Edge Bridge (BEB) that is injecting the multicast stream into the SPB cloud/network.

A sender node can also set the multicast bit in the B-MAC and set all other bits to all zeroes. Such a configuration can be used in the core transport network to signal the I-SID as a multicast service I-SID, and can be used to compare with multicast I-SID receivers. Changing the SPB SPF algorithm can involve comparing requested nicknames when matching the I-SID(Tx) from the upstream root node to the I-SID(Rx) on the downstream sub-tree. The requested nickname can be encoded into the B-MAC in the I-SID Address TLVs sent by the receiver node to the nickname of the sender node advertising the I-SID(Tx). A multicast state can then be built when the nickname of the transmitter matches with the nickname (encoded as a B-MAC) in the I-SID Address TLV of the receiver. Accordingly, techniques disclosed herein creatively interpret and extend I-SID Address TLV/Sub-TLVs to support L3 multicast applications. Such techniques simplify SPF computation and reduce the amount of multicast state data that needs to be computed and installed in the core of an SPB Network.

One embodiment includes a multicast manager that executes a multicast routing process and/or system as a Layer 2 service within a Shortest Path Bridging (SPB) network. The multicast manager receives a first control message at a first data switching device (network node). The first data switching device functions as a Backbone Core Bridge within a transport network, in which the transport network uses SPB protocol. The SPB standardized protocol defines Backbone Core Bridges. The first control message is an Intermediate System To Intermediate System (IS-IS) Layer 2 control message having a type-length-value (TLV) structure. The first control message originates from a second data switching device. The second data switching device functions as a Backbone Edge Bridge within the transport network, the first control message indicates that the second data switching device is a transmitter node for a multicast data stream. The multicast data stream is identified within the control message using a service instance identifier (I-SID). The multicast manager can then update a link state database, such as IS-IS Link State Database (LSDB) or other data store used by the first data switching device. The link state database is updated so as to indicate that the second data switching device is listed as a transmitter node for the first I-SID.

The multicast manager receives a second control message at the first data switching device. The second control message originates from a third data switching device. The third data switching device functions as a Backbone Edge Bridge within the transport network. The second control message indicates that the third data switching device is a receiver node for the multicast data stream identified using both the I-SID and a nickname of the second data switching device. Note a typical arrangement includes multiple receiver nodes requesting the multicast data stream. In response to identifying that a combination of the I-SID and the nickname for the second data switching device matches a record in the link state database, the multicast manager builds a forwarding table used by the first data switching device such that data packets indicating the I-SID and also indicating the second data switching device as the transmitter node are routed to the third data switching device. Data packets from the multicast data stream can then be forwarded according to the forwarding table. Thus, by indicating both an I-SID and a linked nickname, the SPB network can build source-specific multicast states, thereby efficiently routing and switching multicast data traffic.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving a first control message at a first data switching device, the first data switching device functioning as a Backbone Core Bridge within a transport network using Shortest Path Bridging protocol, the first control message being an Intermediate System To Intermediate System (IS-IS) Layer 2 control message having a type-length-value (TLV) structure, the first control message originating from a second data switching device, the second data switching device functioning as a Backbone Edge Bridge within the transport network, the first control message indicating that the second data switching device is a transmitter node for a multicast data stream, the multicast data stream identified using a service instance identifier (I-SID); updating a link state database used by the first data switching device such that the link state database indicates that the second data switching device is the transmitter node for the first I-SID; receiving a second control message at the first data switching device, the second control message originating from a third data switching device, the third data switching device functioning as a Backbone Edge Bridge within the transport network, the second control message indicating that the third data switching device is a receiver node for the multicast data stream identified using both the I-SID and a nickname of the second data switching device; in response to identifying that a combination of the I-SID and the nickname for the second data switching device matches a record in the link state database, building a forwarding table used by the first data switching device such that data packets indicating the I-SID and also indicating the second data switching device as the transmitter node are routed to the third data switching device; and forwarding data packets corresponding to the multicast data according to the forwarding table. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Avaya, Inc. of Lincroft, N.J.

As discussed above, techniques herein are well suited for use in software applications supporting SPB multicast routing and associated operations. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Figure 1:
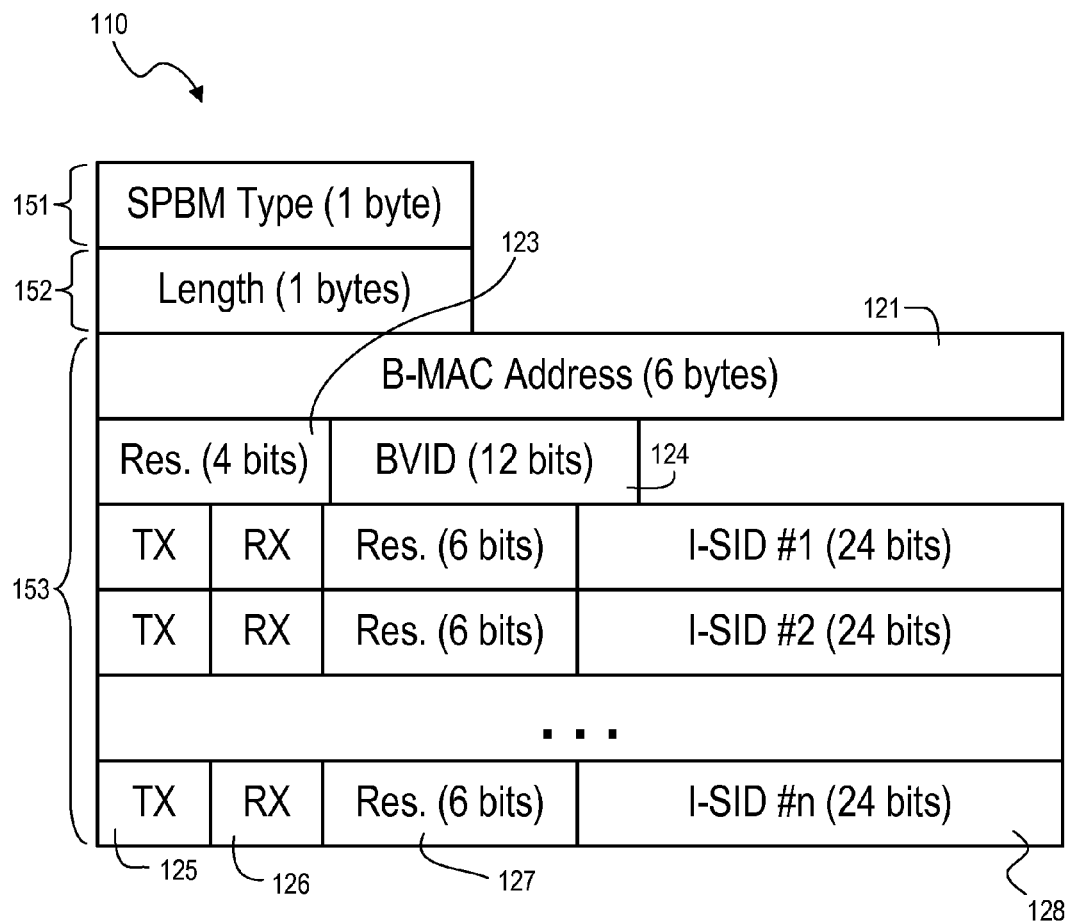
FIG. 1 is a diagram of an SPB-MAC Service Identifier and Unicast Address Sub-TLV used with IS-IS according to embodiments herein.

Techniques disclosed herein include systems and methods for improving efficiency of multicast state generation. Techniques include using an IS-IS TLV structure with new multicast state computation rules for SPB Networks. SPB Networks use a TLV field for the I-SID Address (and equivalent TLV fields defined in different IETF/IEEE drafts) to signal information that is used to compute a multicast state required to provide L2 Services over a given SPB Network. The I-SID Address TLV is set or filled to carry various items of information. These items of information can include Backbone Media Access Control (B-MAC), Virtual Local Area Network Identifier (VID), I-SID[Transmit, Receive Bit], etc.

Techniques disclosed herein enable Internet Protocol (IP) multicasting and multicasting applications over a Shortest Path Bridging network. In other words, methods herein support L3 multicast using IS-IS. A typical multicast distribution model is a one-to-many relationship. For example, there is one sender for a particular group of receivers scattered across a network. IP multicasting technology aims to deliver a data stream to all receivers who want to receive that data stream, but by forwarding only to those interested receivers (those who have requested the data stream). In contrast, providing multicasting by filtering broadcasted data at each receiver is inefficient. Conventional techniques do not exist for IP multicasting over an SPB network, with sources and receivers located outside of the SPB network.

The system disclosed herein uses IS-IS as a protocol in the SPB network to convey routing information from one side of the SPB network to the other side. Thus, IS-IS is used to inform other edge devices of sources available in the network. This routing/control plane information propagation is seen by all of the devices (nodes) within the SPB network. Sending nodes having a data stream source convey that information to other SPB devices. Receiving nodes indicate data streams that the receiving nodes want to receive. Accordingly, by having knowledge of both sources and receivers, a network can build efficient data paths to deliver the data streams from the source(s) to only the receivers, without sending traffic on links that do not lead to receivers.

Techniques include configuring Backbone Edge Bridges (BEBs) to advertise to the SPB network multicast sources available locally, and to inform the network of requests to join a particular multicast stream. Each source/multicast stream is identified by an IP multicast source and group address from an external or access network. Upon receiving a given multicast stream from an access network, the BEB allocates a data I-SID (a service identifier) for that multicast stream. Note that such I-SID allocation is local and dynamic, meaning that multiple BEBs can assign the same I-SIDs for different multicast streams. By having local allocation of I-SIDs, the SPB network can scale easily without having to coordinate use of unique I-SIDs among the BEBs in the SPB network.

While, there exists the possibility that any two or more data streams may allocate a same I-SID for distinct data streams, BEBs within the SPB network each have unique nicknames. BEB nicknames can be included in a B-MAC field of IS-IS TLV control messages. For example, a given source BEB nickname can use up to 24 bits, while a data I-SID can use up to 24 bits. Devices in the SPB network forward traffic based on MAC address headers of packets (MAC encapsulation). Upon entering the SPB network at a BEB, packets are encapsulated with a transport header, and a destination address in the transport header is a MAC address. This MAC address can be a multicast MAC address consisting of the source BEB and the corresponding I-SID. Receiving BEBs use IS-IS to indicate a desire to receive a particular I-SID.

Using IS-IS, an SPB network can build link state and forwarding information. A given receiver node needs to know where a source is located to request an associated data stream. The allocation of a data I-SID along with an identification of the corresponding backbone edge bridge, are not known to receiving nodes until the sending/transmitting BEB announces the stream. If there are no receivers indicated within the transport network, then the multicast stream remains at the transmitter BEB. After a given stream is announced, and after a receiving node joins the stream, then the stream can be transmitted across the transport network based on network topology or a graph of the network.

One kind of IS-IS control message indicates that a particular BEB that has a multicast stream and also indicates an I-SID that will be used to transmit the stream. Another kind (same type of message but different values) of IS-IS control message originates from a receiver and indicates a desire to join a particular multicast stream (I-SID.) These control messages are independent of each other.

Techniques herein change rules that IS-IS and SPB use for computing multicast states in the SPB network. This includes modifying rules involving TLV structures and interpretation of TLV and sub-TLV structures.

FIG. 1 shows a TLV structure for IS-IS. In general this graphical representation includes a type portion 151, a length portion 152, and a value portion 153. The type portion or type field indicates how the following data and/or data fields should be interpreted. For example, one particular TLV is known as "SPBM Service Identifier and Unicast Address TLV." This type can be indicated in the type field, which triggers corresponding interpretation at network nodes. SPB core and edge node are configured to execute certain actions depending on a TLV type. An amount of data and fields can be indicated in the length field. In TLV 110, the first value field 121 is a B-MAC address field spanning 6 bytes, a reserved field of 4 bits 123, and Backbone VLAN identifier field 124.

The B-MAC address field 121 can be defined within the address field itself as unicast or multicast BMAC for IP multicast, and can be followed by one or more I-SID fields. I-SID fields can include a transmitter bit 125, and receiver bit 126, reserved bits 127, and I-SID 128 of 24 bits. The various I-SID fields can include different I-SIDs that the BEB is advertising. Within a given I-SID field, there are two subfields for transmit and receive information. Accordingly, a given BEB can indicate that it is the transmitter, or receiver, or both for a corresponding I-SID. For a Layer2 Virtual Service Network (VSN) service, a particular BEB can both send and receive data. For IP multicast, however, typically either the transmit bit is set or the receive bit is set, but not both.

IS-IS can create a forwarding state based on a specific system ID identified from a control message of a sending BEB. Nodes can send B-MAC unicast addresses in a field of control messages, and then this information is used to create a unicast forwarding information base. B-MAC fields in a control message can include a BVID, such as in field 124. The BVID can be used to identify VLANs on which to send traffic. The BVID can also be used to create multicast trees within the SPB network. The I-SID is typically used as a service identifier with global scope for Layer-2 services. With IP multicast, the I-SID is no longer of global scope and can be considered specific to the BEB who is sending it. This can create challenges because a given I-SID can be associated with (used by) more than one BEB. For example, when a given IS-IS TLV control message arrives at a given node within the SPB network, and that given IS-IS TLV has a receive bit set for a specific I-SID, then the given node will look through its records to find all nodes that have advertised as a transmitter for that specific I-SID. The receiving node then adds the given receiver node as a receiver for all transmitting nodes having a matching I-SID (which can be more than one transmitting node).

With any matches identified, the given node can create multicast states. A corresponding multicast state that is built can be based on BVLAN information and B-MAC-DA information. The multicast B-MAC-DA consists of a combination of a nickname—that identifies the source—and an I-SID. As such, when a receive request IS-IS control message is processed at a given node, then that given node examines its entire link state database and finds all nodes advertising the particular I-SID as a transmitter node. By way of a non-limiting example, there might be ten different nodes advertising this particular I-SID with a transmit bit (there are commonly duplicate I-SIDs since I-SIDS are locally assigned). The given node will then build a forwarding table that transmits data streams from all ten of these nodes, even though only one stream is desired and is the correct stream. In other words, IS-IS conventionally treats such control messages as a global identifier or source wildcard. Thus, for ten devices advertising as a transmitter for a specific I-SID, the given node will compute ten forwarding records. In some data models this forwarding result can be useful. With multicasting, however, there is typically only one sender from whom multiple receivers wish to receive. Such a global forwarding configuration, therefore, is inefficient and undesirable.

Embodiments disclosed herein execute a source-specific interpretation on multicast TLV control messaging, this can include modifying and/or configuring the IS-IS protocol to accommodate such source-specific interpretation. Modifications primarily relate to how bits are set within control messaging that requests one or more data streams, as well as how the nodes within the SPB network interpret such requests. In some embodiments, control messaging can differ between transmitter advertisements and receiver requests. This difference can be found in the B-MAC-DA. Both can be MAC-in-MAC encapsulated, but can have a different B-MAC-DA between two different data streams. By way of a specific example, the top 24 bits can differ. Both transmission advertisements and receiver requests can use a conventional TLV structure, but in place of setting a unicast address, a multicast address is set. With the receiver control message, the multicast address indicates a node from which to receive a data stream. Specifically, the top 24 bits will be set to indicate a nickname of the requested node, followed by one or more I-SIDs. With the advertisement control message, however, in place of the node nickname, these bits can all be set to zero.

Accordingly, when a node receives such an advertisement, the node identifies whether this control message (advertisement) relates the unicast or multicast. The MAC address definition already defines a bit that indicates whether the data resource is unicast or multicast. If the resource is a unicast address, then forwarding operations continue normally according to IS-IS protocol. Conventional IS-IS rules indicate what data switching operations to perform for a unicast address (such as computing senders and joining trees), which is similar to operations to perform for a multicast address.

With embodiments herein, if the control message indicates a multicast address, then the node responds differently. In response to a multicast address, the node computes a forwarding state based on the top 24 bits of the multicast address from the B-MAC-DA, and the lower 24 bits (I-SID), and joins or links these two items of information. Thus, the present disclosure can reuse the existing TLV, or sub-TLV, structures by creatively interpreting the MAC address field. Thus, when a B-MAC address field identifies itself as multicast, then the B-MAC address field is interpreted differently. Note that each node within the SPB network receives the same control plane information and thus executes this computation. This computation can include computing a path from a sender to a receiver based on a graph or topology of the network. By having the same view of senders and receivers, nodes within the transport network can use IS-IS to compute paths. Thus, with a multicast TLV address, and associated interpretation changes, each node only computes a state of the one sender specified, instead of all nodes linked to a given I-SID.

Figure 2:
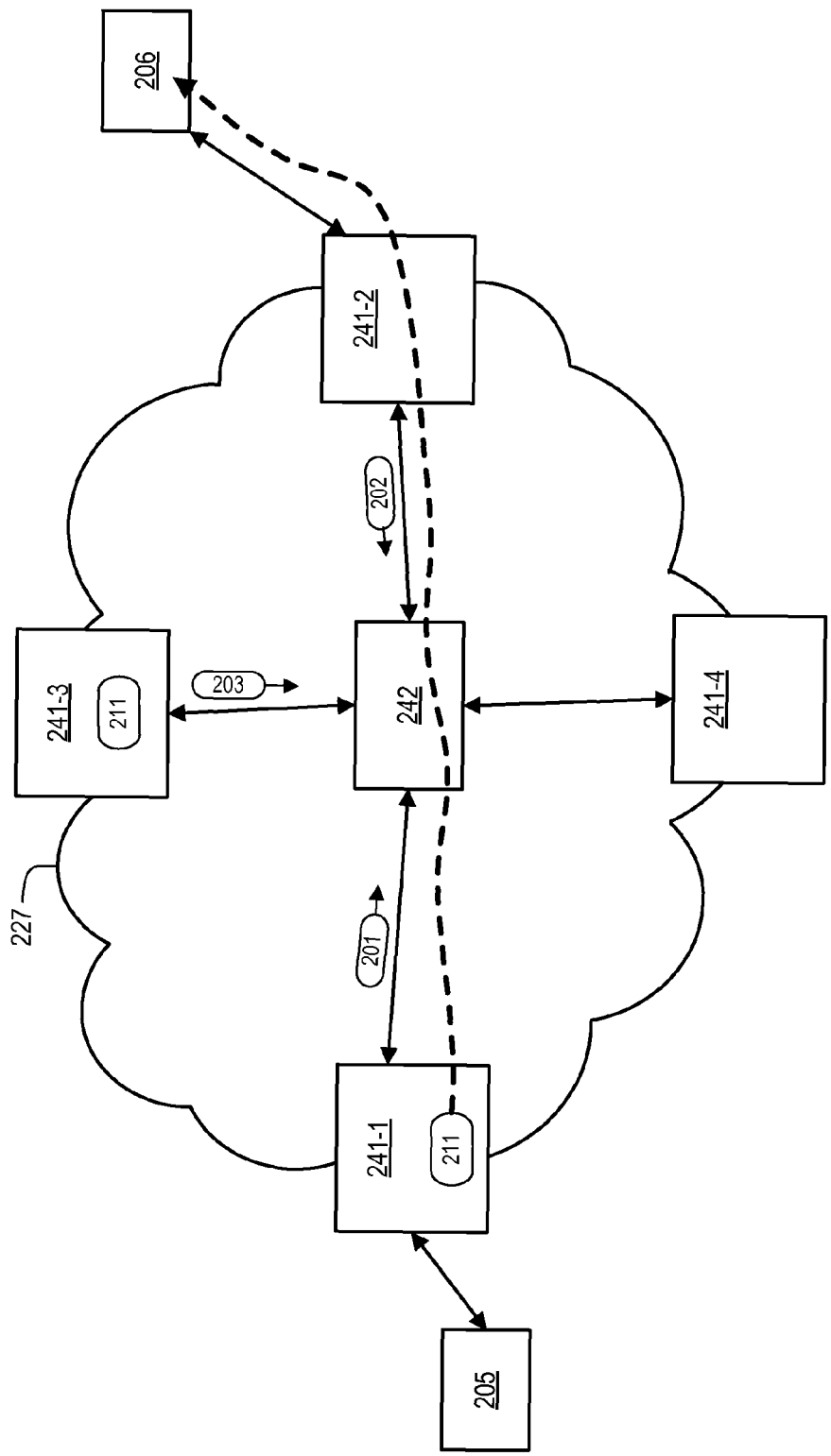
FIG. 2 is a block diagram of a SPB network providing multicast state creation according to embodiments herein.

FIG. 2 illustrates example control messaging and interpretation using a simplified model of an SPB network 227. SPB network 227 includes Backbone Edge Bridges 241-1, 241-2, 241-3, 241-4, and Backbone Core Bridge 242. In this example, there is an IP multicast source 205 located logically outside the SPB network, such as within (or attached to) an access network. Receiver 206 is also located outside of the SPB network, and is set to signal a request to receive the IP multicast source. BEB 241-1 records the IP multicast source available, and assigns a local I-SID 211. BEB 241-2 also records that attached receiver 206 would like to receive the IP multicast. Note, however, that BEB 241-3 also includes I-SID 211, though for a different data stream. While these two I-SIDs have identical numbers or IDs, the data streams that each I-SID references are different.

BEBs 241-1 and 241-3 send control messages 201 and 203 respectively. The B-MAC-DA being sent can indicate a multicast address bit, while other bits in that field are set to zero. These two transmitting nodes do not need to indicate a nickname in this field because BCB 242 knows the source node, such as from the Source Address field.

On the receiver side, BEB 241-2 sends control message 203, received at BCB 242. BEB 241-2 sets a multicast bit, and additionally sets a nickname of the node containing the requested stream. In this example, the nickname refers to the nickname of BEB 241-1. Thus, BEB 241-2 is requesting I-SID 211, but only from BEB 241-1. Note that each node within the transport network/cloud/SPB network 227 can be identified with a 20 bit nickname (it is the top 24 bits that are unique within the SPB network).

In other words, techniques disclosed herein enable SPB nodes to request a tree computation from a single BEB for a given I-SID. This can include a TLV structure for requesting a tree definition from a tree to join a tree from a single BEB. In essence, the TLV is requesting a tree construction, yet without having any user-specific information. This keeps the SPB network running smoothly and efficiently. In other words, the control messages do not need to be used to signal how a particular tree is going to be used (i.e. IP multicasting or other application), instead, the control messages simply signal its creation and construction. Accordingly, this technique enables constructing trees for one-to-many relationships.

One benefit of such technique is enabling each node within the SPB network to operate independently when allocating I-SIDs. Without such techniques, nodes would need to strictly coordinate and allocate I-SID usage. Such coordination could require stream separation based on the I-SIDs computed at the edges, which means a lot of overhead and additional mechanisms to insure that I-SIDs are not used for more than one stream. Such I-SID coordination essentially prevents dynamic I-SID assignment results in manual allocation of I-SIDs. Manual allocation of I-SIDs is time consuming, does not scale well, fragments the I-SID space, and increases the potential for errors. By making it possible to request a stream from a specific node, edge devices or edge nodes do not need to coordinate how to allocate I-SIDs, thereby enabling dynamic I-SID allocation. Dynamic I-SID allocation means minimal operator intervention.

In another embodiment, the TLV structure itself can be modified to specifically indicate a source BEB. Alternatively, a length of the B-MAC nickname can be changed, or use a System ID to indirectly derive a nickname of a transmitter BEB.

Figure 5:
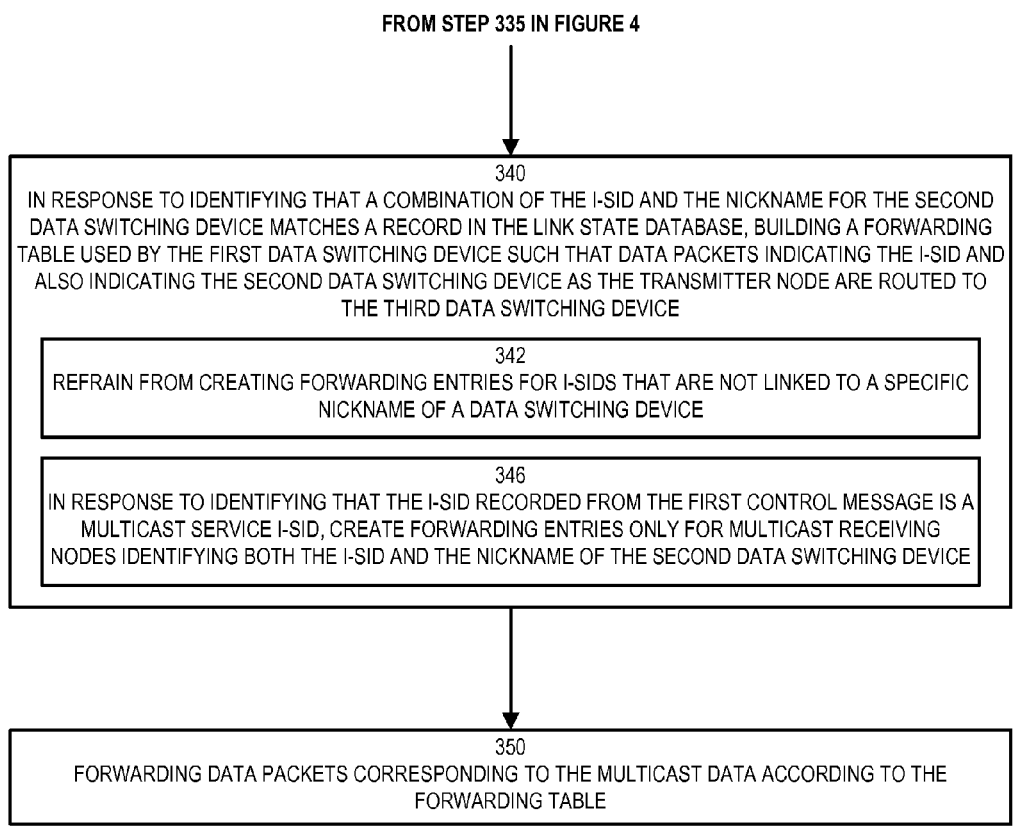
Figure 6:
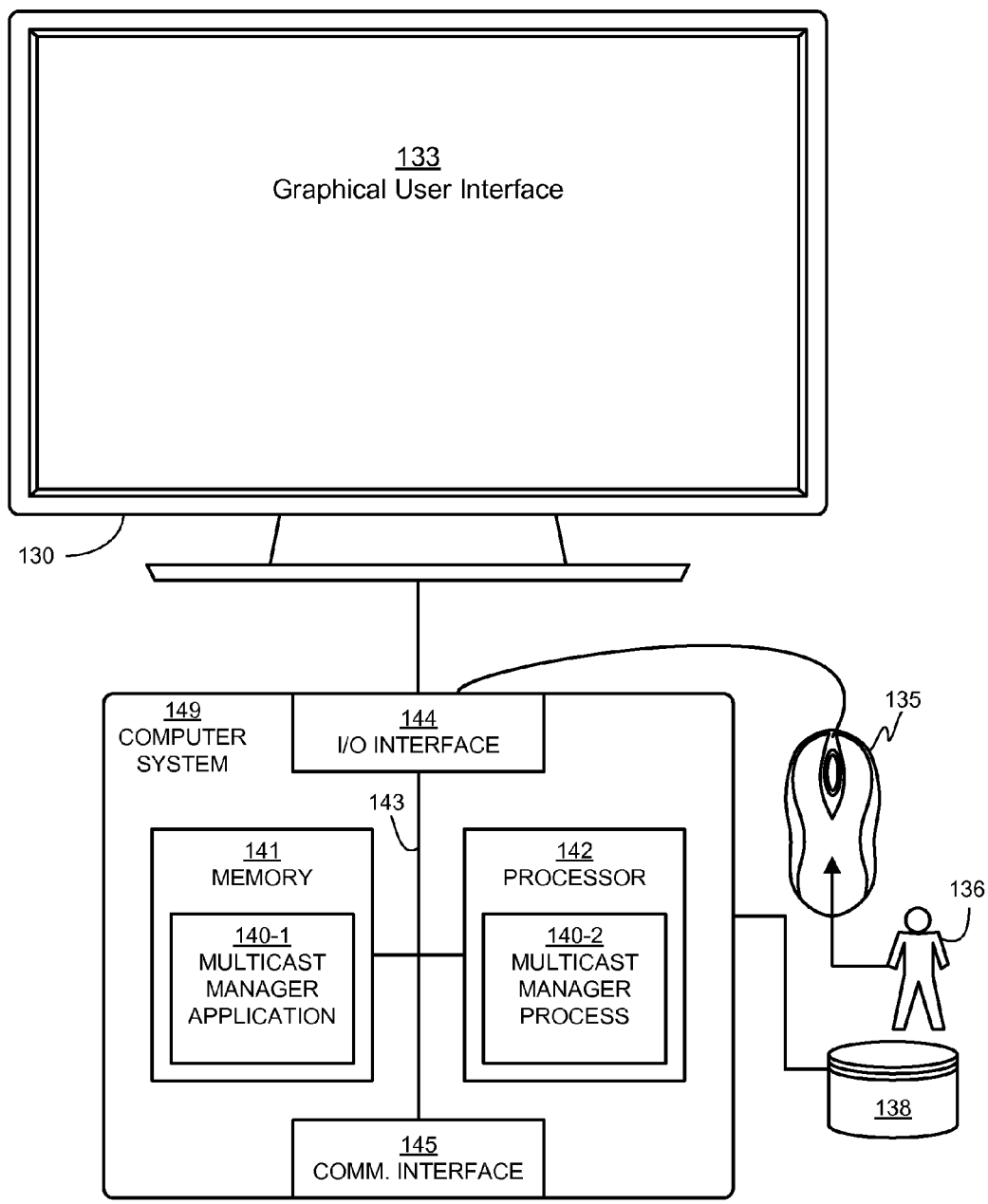
FIG. 6 is an example block diagram of a multicast manager operating in a computer/network environment according to embodiments herein.

FIG. 6 illustrates an example block diagram of a multicast manager 140 operating in a computer/network environment according to embodiments herein. Computer system hardware aspects of FIG. 6 will be described in more detail following a description of the flow charts. Functionality associated with multicast manager 140 will now be discussed via flowcharts and diagrams in FIG. 3 through FIG. 5. For purposes of the following discussion, the multicast manager 140 or other appropriate entity performs steps in the flowcharts.

Figure 3:
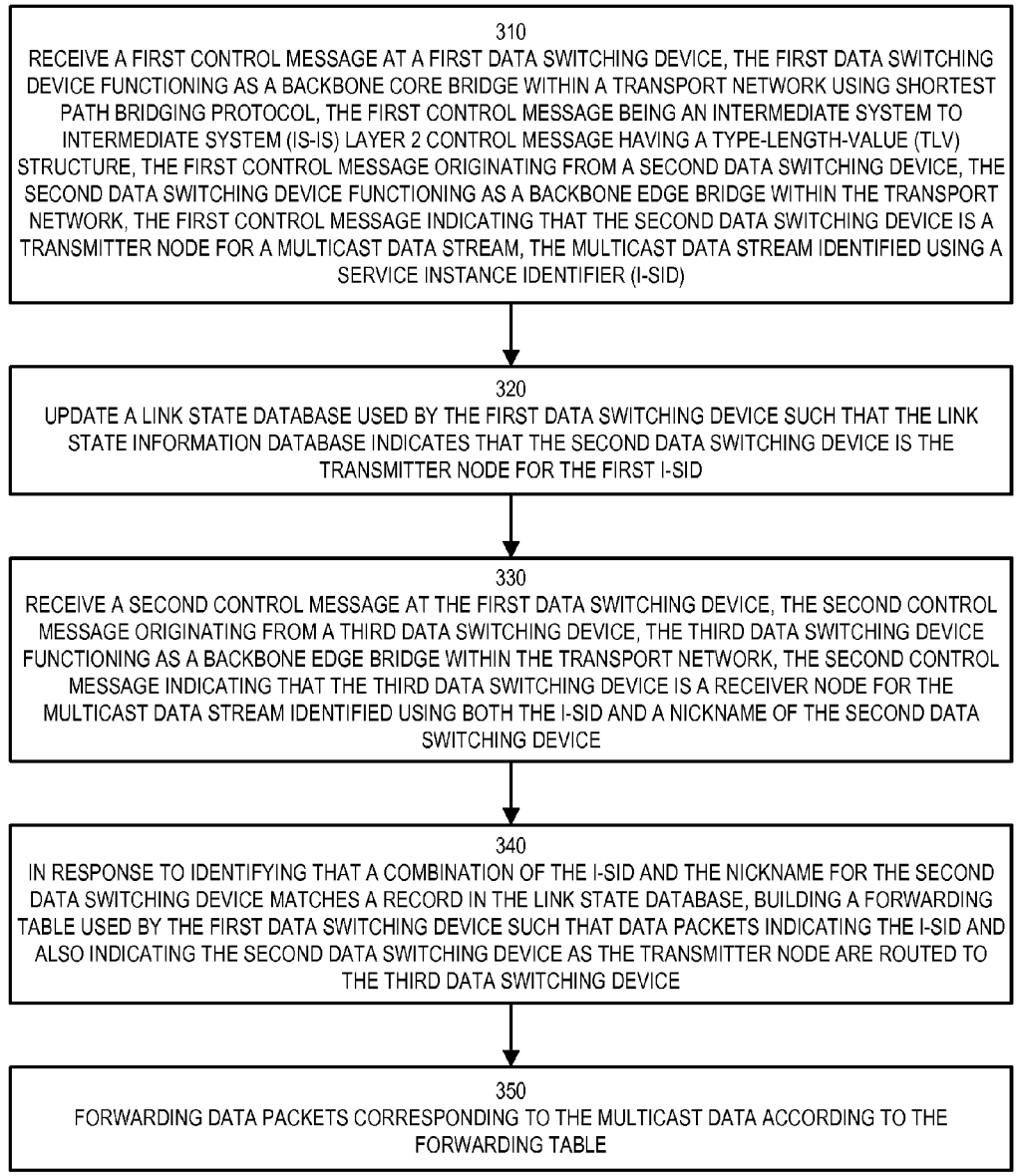
FIG. 3 is a flowchart illustrating an example of a process supporting multicast state creation in an SPB network according to embodiments herein.

Now describing embodiments more specifically, FIG. 3 is a flow chart illustrating embodiments disclosed herein. In step 310, multicast manager 140 receives a first control message at a first data switching device. The first data switching device functions as a Backbone Core Bridge within a transport network using Shortest Path Bridging protocol. This first control message is an Intermediate System To Intermediate System (IS-IS) Layer 2 control message having a type-length-value (TLV) structure, such as according to the IS-IS messaging protocol. This first control message originates from a second data switching device, that is, the first control message may be received directly from the second data switching device, or after being forwarded by one or more intermediate nodes. The second data switching device is configured such as to function as a Backbone Edge Bridge (BEB) within the transport network. The first control message indicates that the second data switching device is a transmitter node for a multicast data stream, with the multicast data stream identified using a service instance identifier (I-SID). The multicast data stream refers to an available network resource that can be transmitted in a sequence over time, such as by transmitting a sequence of data packets, and/or the actual sequence of data packets being transmitted. In other words, the second data switching device (BEB) uses IS-IS to advertise availability of a multicast data stream/network resource.

In step 320, the multicast manager 140 updates a link state database used by the first data switching device such that the link state database indicates that the second data switching device is the transmitter node for the first I-SID. Thus, the first data switching device records or otherwise notes the I-SID available from the second data switching device.

In step 330, the multicast manager 140 receives a second control message at the first data switching device. The second control message originates from a third data switching device. This third data switching device functions as a Backbone Edge Bridge within the transport network (according to the SPB protocol). The second control message indicates that the third data switching device is a receiver node for the multicast data stream, and this control message identifies the multicast data stream using both the I-SID and a nickname of the second data switching device. In other words, the third data switching device sends a request to receive the multicast data stream (resource identified by the I-SID) and to receive this data stream from a specific source (identified by the nickname).

In step 340, in response to identifying that a combination of the I-SID and the nickname for the second data switching device matches a record in the link state database, the multicast manager 140 builds a forwarding table used by the first data switching device. The forwarding table (or multicast state) is built such that multicast data packets indicating the I-SID and also indicating the second data switching device as the transmitter node are routed to the third data switching device.

In step 350, the multicast manager 140 or transport node forwards data packets corresponding to the multicast data stream according to the forwarding table or multicast state built.

Figure 4:
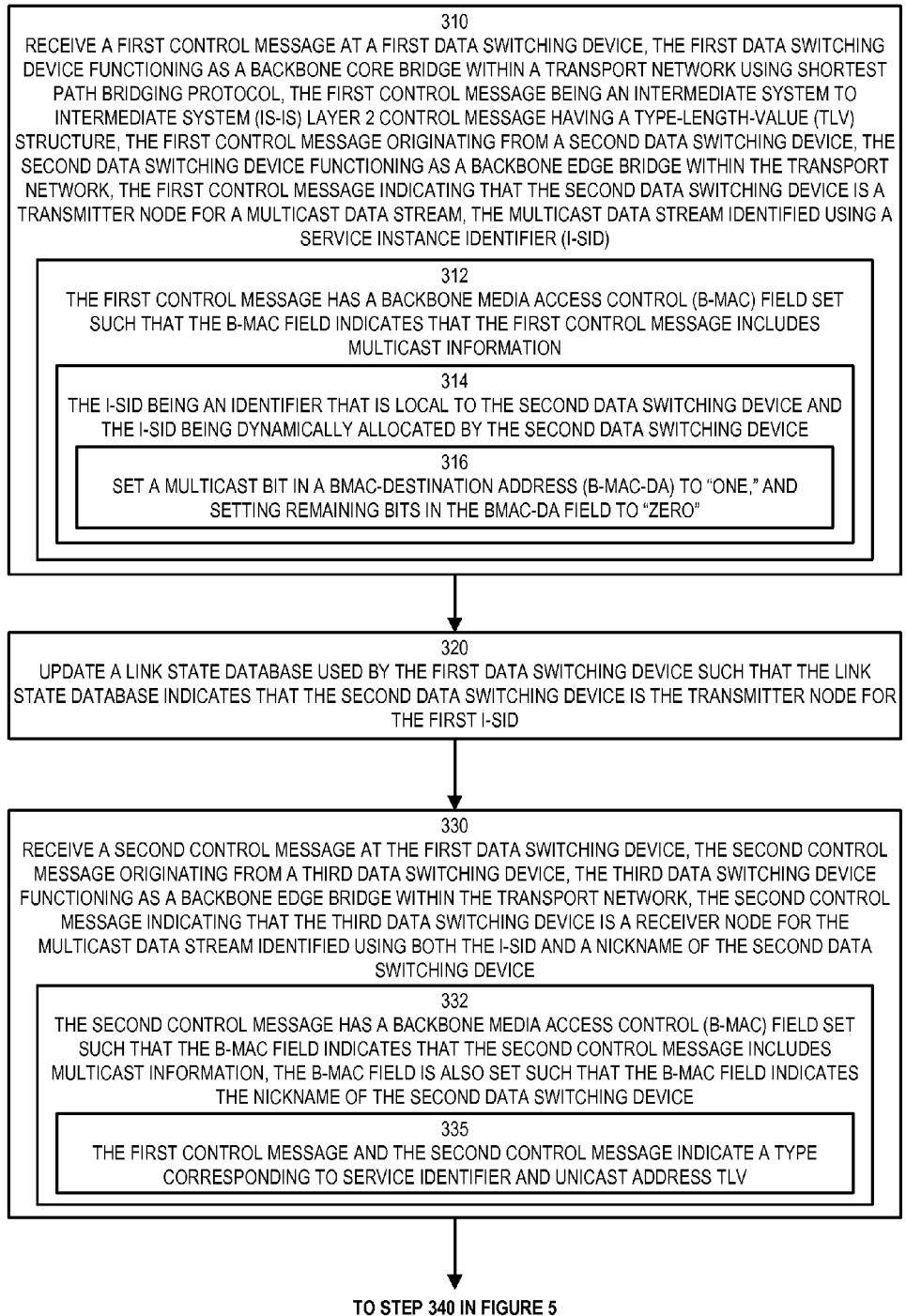
FIGS. 4-5 are a flowchart illustrating an example of a process supporting multicast state creation in an SPB network according to embodiments herein.

FIGS. 4-5 include a flow chart illustrating additional and/or alternative embodiments and optional functionality of the multicast manager 140 as disclosed herein.

In step 310, multicast manager 140 receives a first control message at a first data switching device. The first data switching device functions as a Backbone Core Bridge within a transport network using Shortest Path Bridging protocol. This first control message is an Intermediate System To Intermediate System (IS-IS) Layer 2 control message having a type-length-value (TLV) structure, such as according to the IS-IS messaging protocol. This first control message originates from a second data switching device, that is, the first control message may be received directly from the second data switching device, or after being forwarded by one or more intermediate nodes. The second data switching device is configured such as to function as a Backbone Edge Bridge (BEB) within the transport network. The first control message indicates that the second data switching device is a transmitter node for a multicast data stream, with the multicast data stream identified using a service instance identifier (I-SID).

In step 312, the first control message has a Backbone Media Access Control (B-MAC) field set such that the B-MAC field indicates that the first control message includes multicast information.

In step 314, the I-SID is an identifier that is local to the second data switching device in that the I-SID is dynamically allocated by the second data switching device. This means that other nodes within the network may allocate this same I-SID to different data streams.

In step 316, the multicast manager 140 sets a multicast bit in a B-MAC-Destination Address (B-MAC-DA) to "one" (or otherwise indicates that the control message relates to multicast traffic), and sets remaining bits in the B-MAC-DA field to "zero" or otherwise refrains from indicating additional information in the B-MAC-DA field. Alternatively, after setting the multicast bit to "one," the remaining bits in this field can be set to any combination of ones and zeros, and can be ignored for interpretation.

In step 320, the multicast manager 140 updates a link state database used by the first data switching device such that the link state database indicates that the second data switching device is the transmitter node for the first I-SID.

In step 330, the multicast manager 140 receives a second control message at the first data switching device. The second control message originates from a third data switching device. This third data switching device functions as a Backbone Edge Bridge within the transport network (according to the SPB protocol). The second control message indicates that the third data switching device is a receiver node for the multicast data stream, and this control message identifies the multicast data stream using both the I-SID and a nickname of the second data switching device.

In step 332, the second control message has a Backbone Media Access Control (B-MAC) field set such that the B-MAC field indicates that the second control message includes multicast information. The B-MAC field is also set such that the B-MAC field indicates the nickname of the second data switching device. The second control message can include an I-SID field to indicate the I-SID. The combined information can be interpreted as making a source-specific request for a specific I-SID.

In step 335, the first control message and the second control message indicate a type corresponding to Service Identifier and Unicast Address TLV. This TLV type is common for creating unicast messaging states.

In step 340, in response to identifying that a combination of the I-SID and the nickname for the second data switching device matches a record in the link state database, the multicast manager 140 builds a forwarding table used by the first data switching device. The forwarding table (or multicast state) is built such that multicast data packets indicating the I-SID and also indicating the second data switching device as the transmitter node are routed to the third data switching device.

In step 342, the multicast manager 140 refrains from creating forwarding entries for I-SIDs that are not linked to a specific nickname of a data switching device. In other words, the data switching devices are configured such that when interpreting data identified as corresponding to multicast data, if there is no source identified as linked to a given I-SID, then the multicast manager 140 does not create a multicast state.

In step 346, in response to identifying that the I-SID recorded from the first control message is a multicast service I-SID, the multicast manager 140 creates forwarding entries only for multicast receiving nodes identifying both the I-SID and the nickname of the second data switching device, thereby efficiently routing multicast data streams.

In step 350, the multicast manager 140 or transport node forwards data packets corresponding to the multicast data according to the forwarding table or multicast state built.

In another embodiment, multicast manager 140 operates on an edge node creating and processing multicast control messages. The multicast manager 140 receives, at a first data switching device, a multicast data stream to transmit via a transport network using Shortest Path Bridging (SPB) protocol. The first data switching device functioning as a Backbone Edge Bridge within the transport network. The multicast data stream is received from an access network or other attached network that is logically distinct from the SPB network. The multicast manager 140 dynamically allocates a service instance identifier (I-SID) used for transmitting the multicast data stream within the SPB network.

The multicast manager 140 creates a first control message that advertises the first data switching device as a transmitter node for the I-SID. The first control message being an Intermediate System To Intermediate System (IS-IS) Layer 2 control message having a type-length-value (TLV) structure. Creating the first control message includes setting a bit, within a B-MAC-DA field of the first control message, that indicates a multicast control message, that is, a bit that will be interpreted as the control message relating to multicast operations. Creating the first control message includes setting remaining bits within the B-MAC-DA field to zero. This first control message is then forwarded to data switching devices within the SPB network, thereby advertising availability of a multicast data stream.

The multicast manager 140 can also receive a second control message at the first data switching device, the second control message originating from a second data switching device. This second data switching device functions as a Backbone Edge Bridge within the transport network. The second control message indicates that the second data switching device is a receiver node for the multicast data stream identified using both the I-SID and a nickname of the first data switching device. This can include the second control message having a B-MAC-DA field set such that the B-MAC-DA field indicates that the second control message includes multicast information. The B-MAC-DA field is also set such that the B-MAC-DA field indicates the nickname of the first data switching device. The second control message also includes a field to convey the I-SID. The first control message and the second control message can both indicate a type corresponding to Service Identifier and Unicast Address TLV. In response to identifying that a combination of the I-SID and the nickname for the first data switching device matches a record in a link state database, the multicast manager 140 builds a forwarding table used by the first data switching device such that data packets corresponding to the I-SID are routed to the second data switching device. Such forwarding table construction can include refraining from creating forwarding entries for I-SIDs that are not linked to a specific nickname of a data switching device. Thus, the multicast manager 140 can be configured to create forwarding entries only for multicast receiving nodes identifying both the I-SID and the nickname of the first data switching device, and then the first data switching device can forwarding data packets corresponding to the multicast data according to the forwarding table. Such forwarding can include forwarding the data packets according to IS-IS and a topology of the SPB network.

Continuing with FIG. 6, the following discussion provides a basic embodiment indicating how to carry out functionality associated with the multicast manager 140 as discussed above. It should be noted, however, that the actual configuration for carrying out the multicast manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, mainframe computer system, handheld computer, workstation, network computer, router, network switch, bridge, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the multicast manager 140 of computer system 149 to communicate over a network and, if necessary, retrieve any data required to create views, process content, communicate with a user, etc. according to embodiments herein.

As shown, memory system 141 is encoded with multicast manager 140-1 that supports functionality as discussed above and as discussed further below. Multicast manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the multicast manager 140-1. Execution of the multicast manager 140-1 produces processing functionality in multicast manager process 140-2. In other words, the multicast manager process 140-2 represents one or more portions of the multicast manager 140 performing within or upon the processor 142 in the computer system 149.

It should be noted that, in addition to the multicast manager process 140-2 that carries out method operations as discussed herein, other embodiments herein include the multicast manager 140-1 itself (i.e., the un-executed or non-performing logic instructions and/or data). The multicast manager 140-1 may be stored on a non-transitory, tangible computer-readable storage medium including computer readable storage media such as floppy disk, hard disk, optical medium, etc. According to other embodiments, the multicast manager 140-1 can also be stored in a memory type system such as in firmware, read only memory (ROM), or, as in this example, as executable code within the memory system 141.

In addition to these embodiments, it should also be noted that other embodiments herein include the execution of the multicast manager 140-1 in processor 142 as the multicast manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method for packet switching in a Shortest Path Bridging (SPB) network, the computer-implemented method comprising:
   receiving a first control message at a first data switching device, the first data switching device functioning as a Backbone Core Bridge within a transport network using Shortest Path Bridging protocol, the first control message being an Intermediate System To Intermediate System (IS-IS) Layer 2 control message having a type-length-value (TLV) structure, the first control message originating from a second data switching device, the second data switching device functioning as a Backbone Edge Bridge within the transport network, the first control message indicating that the second data switching device is a transmitter node for a multicast data stream, the multicast data stream identified using a service instance identifier (I-SID);
   updating a link state database used by the first data switching device such that the link state database indicates that the second data switching device is the transmitter node for the first I-SID;
   receiving a second control message at the first data switching device, the second control message originating from a third data switching device, the third data switching device functioning as a Backbone Edge Bridge within the transport network, the second control message indicating that the third data switching device is a receiver node for the multicast data stream identified using both the I-SID and a nickname of the second data switching device;
   in response to identifying that a combination of the I-SID and the nickname for the second data switching device matches a record in the link state database, building a forwarding table used by the first data switching device such that data packets indicating the I-SID and also indicating the second data switching device as the transmitter node are routed to the third data switching device wherein building a forwarding table used by the first data switching device includes refraining from creating forwarding entries for I-SIDs that are not linked to a specific nickname of a data switching device; and
   forwarding data packets corresponding to the multicast data according to the forwarding table.

2. The computer-implemented method of claim 1, wherein the second control message indicating that the third data switching device is the receiver node for the multicast data stream identified using both the I-SID and the nickname of the second data switching device includes the second control message having a Backbone Media Access Control (B-MAC) field set such that the B-MAC field indicates that the second control message includes multicast information, the B-MAC field is also set such that the B-MAC field indicates the nickname of the second data switching device.

3. The computer-implemented method of claim 2, wherein the first control message and the second control message indicate a type corresponding to Service Identifier and Unicast Address TLV.

4. The computer-implemented method of claim 1, wherein building a forwarding table used by the first data switching device includes, in response to identifying that the 1-SID recorded from the first control message is a multicast service I-SID, creating forwarding entries only for multicast receiving nodes identifying both the I-SID and the nickname of the second data switching device.

5. The computer-implemented method of claim 1, wherein the first control message indicating that the second data switching device is a transmitter node for the multicast data stream includes the first control message having a Backbone Media Access Control (B-MAC) field set such that the B-MAC field indicates that the first control message includes multicast information.

6. The computer-implemented method of claim 5, wherein the multicast data stream identified using the I-SID includes the I-SID being an identifier that is local to the second data switching device and the I-SID being dynamically allocated by the second data switching device.

7. The computer-implemented method of claim 6, wherein the first control message having the B-MAC field set such that the B-MAC field indicates that the first control message includes multicast information includes setting a multicast bit in a B-MAC-Destination Address (B-MAC-DA) to "one" and setting remaining bits in the B-MAC-DA field to "zero."

8. The method of claim 1 wherein only a single switching device is specified as a multicast transmitter for a given I-SID.

9. A computer program product including a non-transitory computer-storage medium having instructions stored thereon for processing data information, such that the instructions, when carried out by a processing device, cause the processing device to perform the operations of:
receiving a first control message at a first data switching device, the first data switching device functioning as a Backbone Core Bridge within a transport network using Shortest Path Bridging protocol, the first control message being an Intermediate System To Intermediate System (IS-IS) Layer 2 control message having a type-length-value (TLV) structure, the first control message originating from a second data switching device, the second data switching device functioning as a Backbone Edge Bridge within the transport network, the first control message indicating that the second data switching device is a transmitter node for a multicast data stream, the multicast data stream identified using a service instance identifier (I-SID);
updating a link state database used by the first data switching device such that the link state database indicates that the second data switching device is the transmitter node for the first I-SID;
receiving a second control message at the first data switching device, the second control message originating from a third data switching device, the third data switching device functioning as a Backbone Edge Bridge within the transport network, the second control message indicating that the third data switching device is a receiver node for the multicast data stream identified using both the I-SID and a nickname of the second data switching device, the second control message having a Backbone Media Access Control (B-MAC) field set such that the B-MAC field indicates that the second control message includes multicast information, the B-MAC field is also set such that the B-MAC field indicates the nickname of the second data switching device;
in response to identifying that a combination of the I-SID and the nickname for the second data switching device matches a record in the link state database, building a forwarding table used by the first data switching device such that data packets indicating the I-SID and also indicating the second data switching device as the transmitter node are routed to the third data switching device wherein building a forwarding table used by the first data switching device includes refraining from creating forwarding entries for I-SIDs that are not linked to a specific nickname of a data switching device; and
forwarding data packets corresponding to the multicast data according to the forwarding table.

10. The computer program product of claim 9, wherein the first control message indicating that the second data switching device is a transmitter node for the multicast data stream includes the first control message having a Backbone Media Access Control (B-MAC) field set such that the B-MAC field indicates that the first control message includes multicast information.

11. The computer program product of claim 9, wherein the multicast data stream identified using the I-SID includes the I-SID being an identifier that is local to the second data switching device and the I-SID being dynamically allocated by the second data switching device.

12. The computer program product of claim 9 wherein only a single switching device is specified as a multicast transmitter for a given I-SID.

13. A computer-implemented method for packet switching in a Shortest Path Bridging (SPB) network, the computer-implemented method comprising:
receiving, at a first data switching device, a multicast data stream to transmit via a transport network using Shortest Path Bridging (SPB) protocol, the first data switching device being a Backbone Edge Bridge within the transport network, the multicast data stream received from an access network that is logically distinct from the SPB network;
dynamically allocating a service instance identifier (I-SID) used for transmitting the multicast data stream within the SPB network;
creating a first control message that advertises the first data switching device as a transmitter node for the I-SID, the first control message being an Intermediate System To Intermediate System (IS-IS) Layer 2 control message having a type-length-value (TLV) structure;
forwarding the first control message to data switching devices within the SPB network;
receiving a second control message at the first data switching device, the second control message originating from a second data switching device, the second data switching device functioning as a Backbone Edge Bridge within the transport network, the second control message indicating that the second data switching device is a receiver node for the multicast data stream identified using both the I-SID and a nickname of the first data switching device;
in response to identifying that a combination of the I-SID and the nickname for the first data switching device matches a record in a link state database, building a forwarding table used by the first data switching device such that data packets corresponding to the I-SID are routed to the second data switching device wherein building a forwarding table used by the first data switching device includes refraining from creating forwarding entries for I-SIDs that are not linked to a specific nickname of a data switching device; and
forwarding data packets corresponding to the multicast data according to the forwarding table.

14. The computer-implemented method of claim 13, wherein the second control message indicating that the second data switching device is the receiver node for the multicast data stream identified using both the I-SID and the nickname of the first data switching device includes the second control message having a B-MAC-DA field set such that the B-MAC-DA field indicates that the second control message includes multicast information, the B-MAC-DA field is also set such that the B-MAC-DA field indicates the nickname of the first data switching device.

15. The computer-implemented method of claim 14, wherein the first control message and the second control message indicate a type corresponding to Service Identifier and Unicast Address TLV.

16. The computer-implemented method of claim 13, wherein building the forwarding table used by the first data switching device includes creating forwarding entries only for multicast receiving nodes identifying both the I-SID and the nickname of the first data switching device.

17. The computer-implemented method of claim 13, wherein creating the first control message includes setting a bit, within a B-MAC-DA field of the first control message, that indicates a multicast control message.

18. The computer-implemented method of claim 17, wherein creating the first control message includes setting remaining bits within the B-MAC-DA field to zero.

19. The computer-implemented method of claim 13, wherein forwarding data packets corresponding to the multicast data according to the forwarding table include forwarding the data packets according to IS-IS and a topology of the SPB network.

20. The method of claim 13 wherein only a single switching device is specified as a multicast transmitter for a given I-SID.

* * * * *